(12) United States Patent
Gildemeister et al.

(10) Patent No.: US 8,136,502 B2
(45) Date of Patent: Mar. 20, 2012

(54) PISTON AND CONNECTING ROD ASSEMBLY HAVING IMPROVED COOLING CHARACTERISTICS

(75) Inventors: Juan E. Gildemeister, Howell, MI (US); Florin Muscas, Novi, MI (US); Wolfgang O. Rein, Milford, MI (US)

(73) Assignee: Mahle Technology, Inc., Farmington Hills, MI (US)

( * ) Notice: Subject to any disclaimer, the term of this patent is extended or adjusted under 35 U.S.C. 154(b) by 0 days.

(21) Appl. No.: 13/096,191

(22) Filed: Apr. 28, 2011

(65) Prior Publication Data

US 2011/0203547 A1    Aug. 25, 2011

Related U.S. Application Data

(62) Division of application No. 11/243,376, filed on Oct. 4, 2005.

(51) Int. Cl.
*F02F 3/20* (2006.01)

(52) U.S. Cl. ............... 123/197.3; 123/41.35; 123/193.6

(58) Field of Classification Search ............... 123/197.3, 123/193.6, 41.35, 196 R, 196 AB; 92/186
See application file for complete search history.

(56) References Cited

U.S. PATENT DOCUMENTS

| | | | |
|---|---|---|---|
| 3,323,503 A | 6/1967 | Grosshans et al. | |
| 3,762,389 A * | 10/1973 | Malina | 123/197.3 |
| 4,011,797 A * | 3/1977 | Cornet | 92/186 |
| 4,013,047 A * | 3/1977 | Harned | 123/41.2 |
| 4,581,983 A | 4/1986 | Moebus | |
| 4,587,932 A | 5/1986 | Moebus | |
| 5,052,280 A * | 10/1991 | Kopf et al. | 92/186 |
| 5,144,923 A | 9/1992 | Leites et al. | |
| 5,317,958 A | 6/1994 | Martins Leites et al. | |
| 5,685,267 A * | 11/1997 | Wiczynski et al. | 123/197.3 |
| 5,692,430 A | 12/1997 | McLaughlin et al. | |
| 5,778,533 A | 7/1998 | Kemnitz | |
| 6,026,777 A * | 2/2000 | Kemnitz et al. | 123/193.6 |
| 6,202,619 B1 * | 3/2001 | Keller et al. | 123/193.6 |
| 6,327,962 B1 | 12/2001 | Kruse | |
| 6,334,385 B1 | 1/2002 | Wilksch et al. | |
| 6,453,797 B1 | 9/2002 | Bauer | |
| 6,477,941 B1 | 11/2002 | Zhu et al. | |
| 6,491,013 B1 | 12/2002 | Gaiser et al. | |
| 6,494,170 B2 | 12/2002 | Moloney et al. | |
| 6,513,477 B1 | 2/2003 | Gaiser et al. | |
| 6,526,871 B1 | 3/2003 | Zhu et al. | |
| 6,532,913 B1 | 3/2003 | Opris | |
| 6,539,910 B1 | 4/2003 | Gaiser et al. | |
| 6,557,514 B1 | 5/2003 | Gaiser | |
| 6,634,278 B2 | 10/2003 | Bochart | |
| 6,651,549 B2 | 11/2003 | Zhu et al. | |
| 6,701,875 B2 | 3/2004 | Weng et al. | |
| 6,840,155 B2 | 1/2005 | Ribeiro et al. | |
| 2004/0231631 A1 | 11/2004 | Scharp | |
| 2005/0098140 A1 * | 5/2005 | Endoh et al. | 123/197.2 |

* cited by examiner

*Primary Examiner* — M. McMahon
(74) *Attorney, Agent, or Firm* — Bliss McGlynn, P.C.

(57) ABSTRACT

A piston and connecting rod assembly wherein the piston includes an inner cooling gallery defined in the body thereof beneath the crown of the piston, an outer cooling gallery defined between the skirt of the piston and the body and beneath the crown. A pin bore is formed in the body. A connecting rod is adapted to interconnect the piston and crankshaft where the connecting rod has at least one end with a bore extending therethrough and adapted to be aligned with the pin bore of the piston. At least one end of the connecting rod is in fluid communication with the inner cooling gallery of the piston and includes a reservoir formed on the end of the connecting rod which is adapted to collect coolant therein.

11 Claims, 2 Drawing Sheets

PISTON AND CONNECTING ROD ASSEMBLY HAVING IMPROVED COOLING CHARACTERISTICS

CROSS REFERENCE TO RELATED APPLICATIONS

This application is a divisional of U.S. patent application entitled "Piston Having Improved Cooling Characteristics," having Ser. No. 11/243,376, and filed on Oct. 4, 2005.

BACKGROUND OF THE INVENTION

1. Field of the Invention

The present invention relates, generally, to pistons for internal combustion engines and, more specifically, to a piston and connecting rod assembly having improved coolant flow capabilities.

2. Description of the Related Art

Internal combustion engines known in the related art may generally include, among other basic components, an engine block having one or more cylinders, cylinder heads associated with the engine block and pistons supported for reciprocal movement in each cylinder. The piston generally includes a body having a crown and a skirt that depends from the crown. A connecting rod operatively interconnects the piston with a crankshaft. A pin bore is formed in the body and corresponds to a similar bore in the connecting rod. A pin is placed through the corresponding bores to attach the piston to the connecting rod.

Generally, fuel is combusted within the cylinders to reciprocate the pistons. The pistons drive the connecting rod, which drives the crankshaft, causing it to rotate within the engine block. In this way, power may be translated from the crankshaft to drive an automotive vehicle or any number of other devices. Specifically, the combustion pressure within the cylinder drives the piston downward in a substantially rectilinear motion.

The upper surface of the piston crown defines the floor of the combustion chamber within a cylinder. Specifically, the piston crown includes a recessed area commonly referred to as the "combustion bowl," which receives the brunt of energy that is released when fuel is combusted during the operation of an internal combustion engine. Thus, the piston crown is subjected to a disproportionate amount of thermal and mechanical load relative to the remaining portion of the piston body.

In view of these relatively harsh conditions, it is known to provide cooling galleries formed along the underside of the piston crown that are used to reduce surface temperatures on the piston. Generally, the cooling galleries are voids formed within the piston body that are adapted to receive oil as the piston cycles within the cylinder. Movement of the piston within the cylinder transfers oil throughout the cooling galleries, thereby creating a "cocktail shaker" effect as the oil splashes against the walls of these galleries. In this way, the surrounding area of the piston is cooled.

Pistons of the type generally known in the related art may include inner cooling galleries that are generally formed in the body of the piston beneath the crown; and outer cooling galleries that are formed radially spaced from the inner cooling gallery and located closer to the exterior wall of the piston between the skirt and the body of the piston. A wall usually extending between the skirt and the body defines the bottom of the outer cooling gallery. Typically, the inner cooling gallery is longitudinally spaced from the outer cooling gallery and located relatively beneath the outer cooling gallery. Often passages are formed between the inner and outer cooling galleries to promote flow of coolant therebetween.

However, because of the relative position of the inner and outer cooling galleries with respect to each other and the location of the wall that defines the bottom of the outer cooling gallery, the passages extending between the inner and outer cooling gallery are typically drilled through the body of the piston at an oblique angle relative to the surface of the inner cooling gallery. Often, they must be drilled from the interior of the inner cooling gallery outward toward the outer cooling gallery. The oblique passages are difficult to form in practice because they require special drills, equipment and procedures to ensure that a proper passage is effectively drilled in the body of the piston. Importantly, these special considerations increase the cost to manufacture the piston. In addition, and because of the difficulty involved in forming the oblique passages, the scrap rate of the piston can be higher than for those without passages formed between inner and outer cooling galleries. Accordingly, there remains a need in the related art for a piston that employs inner and outer cooling galleries but that may be manufactured with internal passages at a lower cost. In addition, there remains a need in the art for a piston and connecting rod assembly that promote efficient cooling of the related components of the assembly.

SUMMARY OF THE INVENTION

The present invention is directed toward a piston and connecting rod assembly for use in internal combustion engines. The piston is adapted for reciprocal movement within a cylinder of the engine and includes a crown and a skirt depending from the crown. A body extends below the crown and the skirt is disposed annularly about at least a portion of the body. An inner cooling gallery is defined in the body beneath the crown. Similarly, an outer cooling gallery is defined between the skirt and the body and beneath the crown. A pin bore extends through the body. A connecting rod is adapted to interconnect the piston and a crankshaft so as to translate reciprocal movement of the piston into rotational movement of the crankshaft. The connecting rod has at least one end with a bore extending therethrough which is adapted to align with the pin bore in the piston. At least one end of the connecting rod is in fluid communication with the inner cooling gallery of the piston and includes a reservoir formed in this end. The reservoir is adapted to collect coolant therein and serves to maintain an additional volume of coolant within the inner cooling gallery. In this way, efficient, and effective cooling of the piston and connecting rod assembly is promoted.

Other objects, features and advantages of the present invention will be readily appreciated as the same becomes better understood after reading the subsequent description taken in conjunction with the accompanying drawings.

DETAILED DESCRIPTION OF THE PREFERRED EMBODIMENT

Figure 1:
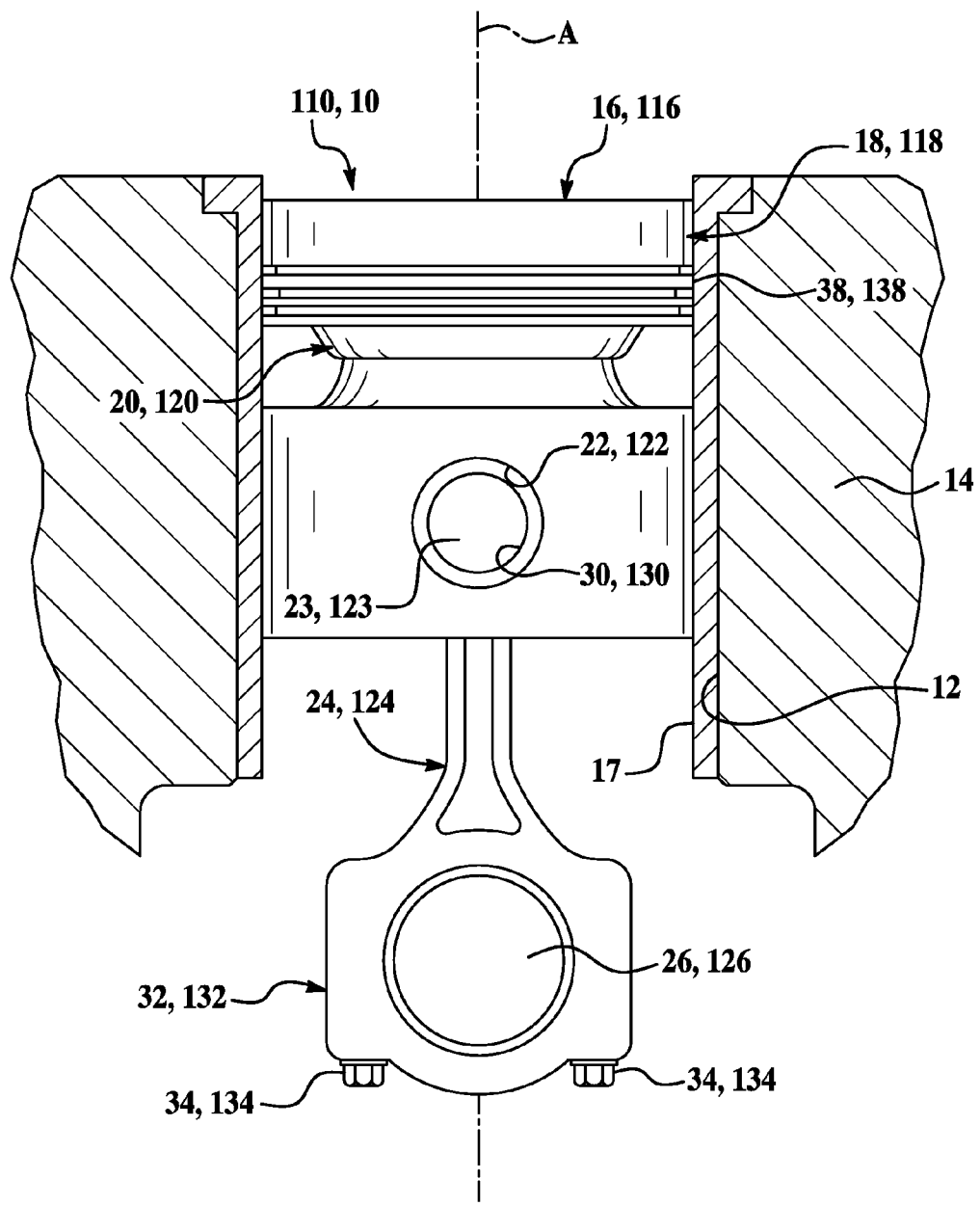
FIG. 1 is a cross-sectional environmental view of a piston and connecting rod assembly operatively disposed within a cylinder of an internal combustion engine.

The present invention overcomes the disadvantages in the related art in a piston having improved cooling characteristics that is generally indicated at 10 in the figures, where like numerals are used to designate like structure. FIG. 1 illustrates an environmental view of the present invention. More specifically, the piston 10, 110 is adapted for reciprocal movement within a cylinder 12 of an internal combustion engine, schematically represented at 14. Those having ordinary skill in the art will appreciate from the description that follows that the piston 10, 110 of the present invention may be employed in a number of different types of internal combustion engines including, but not limited to, spark ignition or compression ignition engines. In addition, it will be further appreciated that the piston 10, 110 of the present invention may be employed in any configuration spanning the entire range from a single cylinder engine through an engine having a multi-bank of cylinders in any configuration such as straight or in-line cylinders, V-shaped, or radial cylinder arrangements. In the preferred embodiment, the piston 10, 110 of the present invention is a single piece, steel piston. However, those having ordinary skill in the art will appreciate that the piston may be formed in multiple pieces and may be made of any suitable material. The cylinder may have a liner 17 that defines the cylinder wall, as is commonly known in the art. The piston 10 includes a crown, generally indicated at 16, 116, and a skirt, generally indicated at 18, 118 depending from the crown 16. A body, generally indicate at 20, 120, extends below the crown 16, 116 with the skirt 18, 118 disposed annularly about at least a portion of the body 20, 120. The body 20, 120 defines a longitudinal axis A that extends in the direction of reciprocal movement of the piston 10, 110. A pin bore 22, 122 is formed in the body 20, 120 and is adapted to receive a pin 23, 123.

A connecting rod, generally indicated at 24, 124, is adapted to interconnect the piston 10, 110 and the crankshaft 26, 126 so as to translate the reciprocal movement of the piston 10, 110 into rotational movement of the crankshaft 26, 126. The connecting rod 24, 124 has at least one end, generally indicated at 28, 128, with a bore 30, 130 extending therethrough and adapted to be aligned with the pin bore 22, 122 in the piston 10, 110 as will be explained in greater detail below. The other end of the connecting rod 24, 124 is generally indicated at 32, 132 and is adapted to be connected to the crankshaft 26, 126 using bolts 34, 134, or any other suitable means commonly known in the art.

The crown 16, 116 of the piston may define a combustion bowl 36, 136 (FIGS. 2 and 3) which is shaped to promote efficient combustion within the chamber defined by the piston 10 and the cylinder 12. The skirt 18, 118 may include a plurality of ring lands 38, 138 that extend annularly about the circumference of the skirt and which are adapted to retain piston rings (not shown). The piston rings are adapted for sliding contact with the liner 17 of the cylinder 12.

As noted above, fuel is combusted within the cylinder 12 to reciprocate the pistons 10, 110. The pistons drive the connecting rod 24, 124, which drives the crankshaft 36, 136, causing it to rotate within the engine block. Combustion pressure within the cylinder drives the piston downward in a substantial rectilinear motion. In these circumstances, the combustion bowl 36, 136 receives the brunt of the energy that is released when the fuel is combusted during the operation of an internal combustion engine. Thus, the piston crown is subjected to a disproportionate amount of thermal and mechanical load relative to the remaining portion of the piston body 20, 120. This thermal load must be dissipated.

Figure 2:
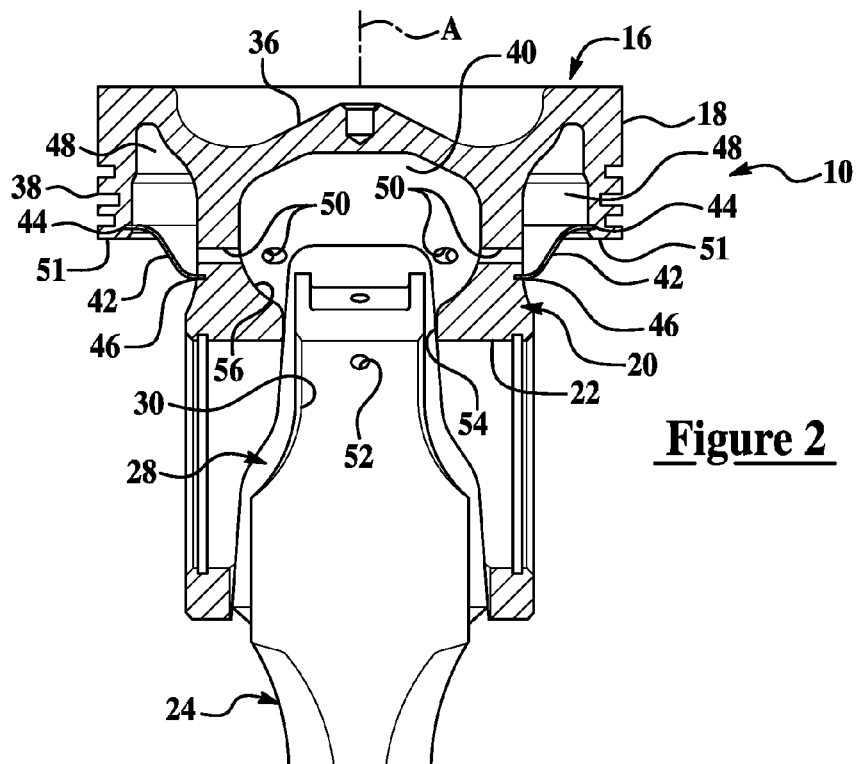
FIG. 2 is a cross-sectional side view of one embodiment of the piston of the present invention illustrating bores extending radially between the inner and outer cooling galleries.

To this end, and referring now to FIG. 2, the piston 10 of the present invention further includes an inner cooling gallery 40 defined in the body 20 beneath the crown 16 as well as an outer cooling gallery 48 defined between the skirt 18 and the body 20 and beneath the crown 16. The outer cooling gallery 48 is disposed annularly about the inner cooling gallery 40 and both the inner and outer cooling galleries 40, 48 are adapted to retain and circulate coolant, such as oil, that serves to reduce the surface temperature of the piston 10. A cover plate 42 extends between the skirt 18 and the body 20 so as to define the bottom wall of the outer cooling gallery 48. The cover plate 42 is operatively attached to the skirt 18 at a location that is longitudinally spaced from the location at which the cover plate 42 is attached to the body 20. More specifically, as illustrated in the figures, the cover plate 42 defines a serpentine shape in cross-section such that one end 44 of the plate 42 is longitudinally spaced from the other end 46 of the cover plate 42.

In addition, the piston 10 of the present invention includes at least one bore 50 that extends radially between the inner cooling gallery 40 and the outer cooling gallery 48 and provides fluid communication of coolant therebetween. More specifically, the bore 50 extends radially and orthogonally relative to the longitudinal axis A of the piston 10. Moreover, and in the preferred embodiment, a plurality of bores extend radially between the inner and outer cooling galleries 40, 48. Each of the plurality of bores 50 is defined in the body 20 at a position that is longitudinally spaced from the lower end 51 of the skirt 18. The radially extending, orthogonal bores 50 further allows for more bores to be disposed about the body 20 of the piston 10 and between the inner and outer cooling galleries 40, 48. Furthermore, this design permits the use of smaller bore diameters which results in better oil distribution and draining as well as avoids pressure drops between the inner and outer cooling galleries.

Each of the plurality of bores 50 may be defined in the body 20 by drilling horizontally through the wall of the body 20. Thereafter, the cover plate 42 may be installed. The spatial relationship of the lower end 51 of the skirt 18 and the serpentine shape of the cover plate 42 facilitate a generally horizontal drilling operation for each of the plurality of bores 50. This greatly simplifies the manufacturing process and reduces the cost of the piston 10.

Moreover, in the design of any piston, the cooling galleries must have an adequate volume in order to facilitate sufficient cooling of the piston. The serpentine shape of the cover plate 42 allows the designers to optimize the height and width ratio as well as maximize the volume of the cooling galleries. This is true even where a shorter compression height is required. Those having ordinary skill in the art will appreciate that the term "compression height" refers to the distance between the centerline of the pin 23 to the top or crown 16 of the piston.

The inner cooling gallery 40 is in fluid communication with the pin bore 22. To this end, the connecting rod may include a bleed passage 52 that extends between the top of the small end 28 of the connecting rod to its pin bore 22. The bleed passage 52 provides fluid communication between the inner cooling gallery 40 and the pin bore 22. In addition, gaps 54 may be formed between the small end 28 of the connecting rod 24 and the bottom wall 56 of the inner cooling gallery 40. Thus, the outer cooling gallery 48 is also in fluid communication with the pin bore 22 through the bores 50 extending radially between the inner and outer cooling galleries 40, 48, respectively via the bleed passage 52 and the gaps 54. In this way, coolant from the galleries 40, 44 may be used to lubricate and cool the pin joint.

Figure 3:
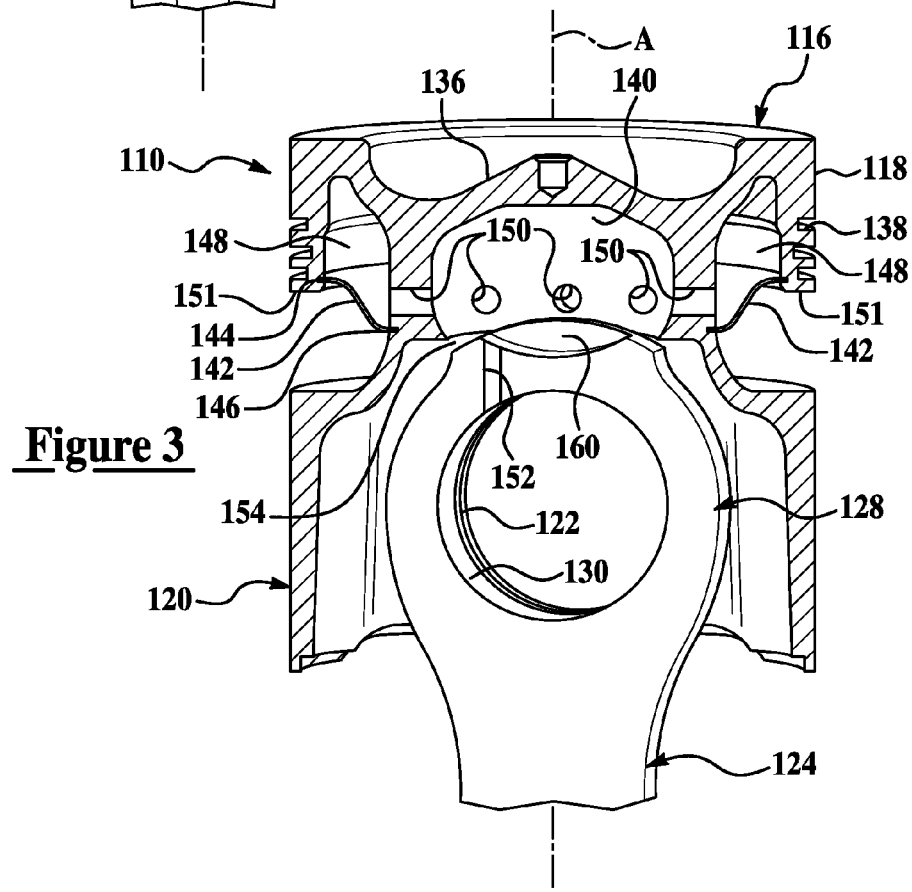
FIG. 3 is a cross-sectional side view of another embodiment of the piston and connecting rod assembly of the present invention illustrating a reservoir formed on the end of the connecting rod.

Referring now to FIG. 3, an alternate embodiment of the present invention is generally indicated at 110 in this figure, where like numerals increased by 100, are used to designate like structure with respect to the piston and connecting rod assembly illustrated in FIG. 2. More specifically, the piston 110 illustrated in FIG. 3 may be substantially similar to the piston 10 illustrated in FIG. 2. Accordingly, the piston 110 may include a crown 116, a skirt 118 depending from the crown 116, as well as a body 120 extending below the crown 116. In addition, the piston 110 may further include an inner cooling gallery 140 defined within the body 120 beneath the crown 116 as well as an outer cooling gallery 148 defined between the skirt 118 and the body 120. A serpentine cover plate 142 may be employed to define the bottom wall of the outer cooling gallery 140. The piston 110 may further include at least one or more bores 150 extending radially between the inner and outer cooling galleries 140, 148, respectively. The bores 150 provide fluid communication between the inner and outer cooling galleries 140, 148, in the same way as described above with respect to the embodiment illustrated in FIG. 2.

The assembly illustrated in FIG. 3 further includes a connecting rod 124 which is adapted to interconnect the piston 110 and the crankshaft 126 so as to translate the reciprocal movement of the piston 110 into rotational movement of the crankshaft 126. Accordingly, the connecting rod 124 has at least one end, generally indicated at 128, having a bore 130 extending therethrough and adapted to be aligned with a pin bore 122 in the piston 110. The end 128 of the connecting rod 124 is in fluid communication with the inner cooling gallery 140 of the piston 110 and includes a reservoir 160 formed on this end 128. The reservoir 160 is adapted to collect and retain coolant therein.

To this end, the end 128 of the connecting rod 124 may define a substantial portion of a bottom wall of the inner cooling gallery 140. The small end 128 of the connecting rod 124 may further include a bleed passage 152 that extends between the reservoir 160 and the pin bore 122. The bleed passage 152 provides fluid communication of coolant between the inner cooling gallery 140 and the pin bore 122. In addition, gaps 154 may be formed between the small end 128 of the connecting rod 124 and the bottom wall of the inner cooling gallery 140. Thus, the outer cooling gallery 148 is also in fluid communication with the pin bore 122 through the bores 150 extending radially between the inner and outer cooling galleries 140, 148, respectively via the bleed passage 152 and the gaps 154.

The reservoir 160 is adapted to collect coolant therein and serves to maintain an additional volume of coolant within the inner cooling gallery 140. Coolant from the galleries 140, 148 may also be employed to lubricate and cool the pin joint. In this way, efficient and effective cooling of the piston and connecting rod assembly 110, 124 may be promoted.

Thus, the piston 10, 110 and connecting rod 24, 124 assembly of the present invention reduces manufacturing costs while at the same time promoting excellent cooling characteristics throughout the assembly.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

We claim:

1. A piston and connecting rod assembly for use in an internal combustion engine, said assembly comprising:

a piston adapted for reciprocal movement within a cylinder of the internal combustion engine, said piston including a crown and a skirt depending from said crown, a body extending below said crown with said skirt disposed annularly about at least a portion of said body, an inner cooling gallery defined in said body beneath said crown, an outer cooling gallery defined between said skirt and said body and beneath said crown, and a pin bore formed in said body;

a connecting rod adapted to interconnect said piston and a crank shaft so as to translate the reciprocal movement of the piston into rotational movement of the crank shaft, said connecting rod having at least one end with a bore extending therethrough and adapted to be aligned with said pin bore in said piston; and said at least one end of said connecting rod being in fluid communication with said inner cooling gallery of said piston and including a reservoir formed on said end which is adapted to collect coolant therein.

2. A piston and connecting rod assembly as set forth in claim 1 wherein said connecting rod further includes a passage extending between said reservoir and said pin bore.

3. A piston and connecting rod assembly as set forth in claim 1 wherein said at least one end of said connecting rod defines a substantial portion of a bottom wall of said inner cooling gallery.

4. A piston and connecting rod assembly as set forth in claim 1 wherein said piston further includes at least one bore extending radially between said inner cooling gallery and said outer cooling gallery for providing fluid communication therebetween.

5. A piston and connecting rod assembly as set forth in claim 4 wherein said body defines a longitudinal axis extending in the direction of reciprocal movement of said piston, said at least one bore extending radially and orthogonally relative to said longitudinal axis and between said inner and outer cooling galleries.

6. A piston and connecting rod assembly as set forth in claim 5 further including a cover plate extending between said skirt and said body so as to define a bottom wall of said outer cooling gallery, said cover plate being operatively attached to said skirt at a location that is longitudinally spaced from the location at which said cover plate is attached to said body so as to accommodate the at least one radial bore extending between said inner and outer cooling galleries.

7. A piston and connecting rod assembly as set forth in claim 5 further including a cover plate extending between said skirt and said body so as to define a bottom wall of said gallery, said cover plate defining a serpentine shape in cross-section such that one end of said plate is longitudinally spaced from the other end of the cover plate so as to accommodate the at least radial bore extending between the inner and outer cooling galleries.

8. A piston and connecting rod assembly as set forth in claim 1 further including a plurality of bores extending radially between said inner and outer cooling galleries.

9. A piston and connecting rod assembly as set forth in claim 1 wherein said outer cooling gallery is disposed annularly about said inner cooling gallery.

10. A piston and connecting rod assembly as set forth in claim 1 wherein said pin bore is adapted to receive a pin to operatively interconnect said piston to a connecting rod, said inner cooling gallery being in fluid communication with said pin bore.

11. A piston and connecting rod assembly as set forth in claim 10 wherein said outer cooling gallery is in fluid communication with said pin bore through said at least one bore extending radially between said inner and outer cooling galleries.

* * * * *